United States Patent [19]

Kuffer

[11] 4,053,765
[45] Oct. 11, 1977

[54] PARALLAX FREE LIGHT PEN
[75] Inventor: Fernand Bannie Kuffer, Brea, Calif.
[73] Assignee: General Dynamics Corporation, Pomona, Calif.
[21] Appl. No.: 727,312
[22] Filed: Sept. 27, 1976
[51] Int. Cl.² ............................................. G02B 5/14
[52] U.S. Cl. .................................... 250/227; 350/10; 350/116
[58] Field of Search ................................. 235/61.11 E; 178/18-20; 340/324 A, 324 AD; 250/227; 350/10, 115, 116

[56] References Cited
U.S. PATENT DOCUMENTS

| | | | |
|---|---|---|---|
| 3,475,612 | 10/1969 | Stupar et al. | 250/227 |
| 3,652,147 | 3/1972 | Mohr | 350/116 |
| 3,937,558 | 2/1976 | Mukai et al. | 250/227 |

Primary Examiner—M. Tokar
Attorney, Agent, or Firm—Neil F. Martin; Edward B. Johnson

[57] ABSTRACT

A light pen sighting device for aligning the receptor of a light pen with an interactive display includes a support member in the form of a transparent plastic body having opposed parallel surfaces with a reticle in the form of points formed in the respective surfaces and a reflector disposed directly between and aligned with the reticle for reflecting light travelling along the axis of the reticle directly into the receptor of a light pen to which the device is mounted, thereby providing a parallex free light pen. An alternate embodiment utilizes fiber-optics for receiving and transmitting light to the receptor.

18 Claims, 6 Drawing Figures

PARALLAX FREE LIGHT PEN

BACKGROUND OF THE INVENTION

The present invention relates to light pens and pertains particularly to a parallax free light pen having means for eliminating parallax between the receptor of the light pen and an interactive light source.

Cathode ray type display devices and interrelated light guns or light pens have been in extensive use for some time. Such display screens have been frequently used to display specific items such as a geographical area with the use of a light gun or light pen interconnected with an associated processing device and further display means for selecting and displaying certain items of information relative to specific items pin-pointed on the larger display. The so-called light pen constitutes a receptor for receiving light from the display tube and initiating a signal for recall and display of reference data related to the specific point of reference, selected by the light pen. In order for the receptor to perform its functions satisfactorily of detecting a specific item of display without confusing the item with surrounding items it is necessary that the receptor be accurately aligned with the light source to remove or eliminate parallax.

While there are many suggestions for overcoming the problem with parallax with other optical and electro-optical systems, a satisfactory solution has not been proposed for the problems associated with the systems such as considered herein. It is desirable that any apparatus for solving such problems be simple, inexpensive and reliable in its operation.

SUMMARY AND OBJECTS OF THE INVENTION

Accordingly, it is the primary object of the present invention to provide a simple and inexpensive aligning device for overcoming the problems of the prior art.

Another object of the present invention is to provide a simple and inexpensive light pen having means for eliminating parallax problems associated therewith.

A further object of the invention is to provide attachment means for light pens that enables the light pen to be quickly and accurately aligned with the light source thereby eliminating parallax between the light source and the receptor of the light pen.

In accordance with the primary aspect of the present invention, means for overcoming the parallax problems of a light pen includes means for defining an axis to be aligned which a light source including means associated therewith for directing light from the source to the receptor of an associated light pen without parallax.

BRIEF DESCRIPTION OF THE DRAWING

The above and other objects of the present invention will become apparent from the following description when read in conjunction with the accompanying drawings, wherein.

DETAILED DESCRIPTION OF THE PREFERRED EMBODIMENTS

Figure 1:
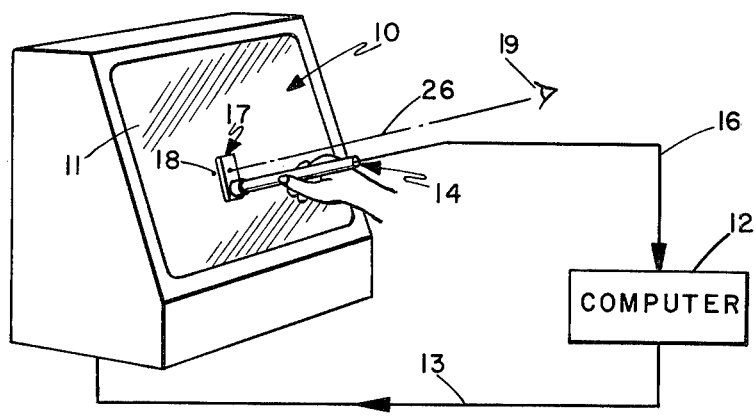
FIG. 1 illustrates diagrammatically the use of the present invention.

Referring now to the drawings and particularly to FIG. 1, there is illustrated an example of an environment in which the present invention would be used. As illustrated in FIG. 1, a body of general information such as a design, a list of names, or a geographical area generally designated by the numeral 10 is displayed on a master screen 11 of a suitable display device such as a cathode ray tube or the like. The information for the display comes from a suitable source such as a computer system 12 which is interconnected by suitable means such as conductors or the like 13. Other more specific information about specific items on the screen may be contained in the computer system and may be retrieved such as by display on another screen or by print out when pinpointed by a light pen to be described. A "light gun" or "light pen" generally designated by the numeral 14 includes an elongated barrel or tubular housing 15 housing and mounting the active components thereof which are interconnected by suitable conductors 16 with the computer system 12. The light pen includes a sighting head or alignment means generally designated by the numeral 17 supported or mounted on the forward end of the barrel 15 for aligning the receptor or light receiving means of the light pen 14 with a selected point such as 18, for example, on the item on display of screen 11. The alignment means 17 enables the user to properly align the receptor of the light pen 14 with the point 18 of light source from screen 11 for eliminating the problem of parallax therebetween. In general, the alignment means 17 (to be more specifically described below) provides means, which when properly aligned between the eye or point of sight 19 of an observer and the point 18 on screen 11, the receptor of pen 14 is properly aligned with light emitting from point 18.

Figure 2:
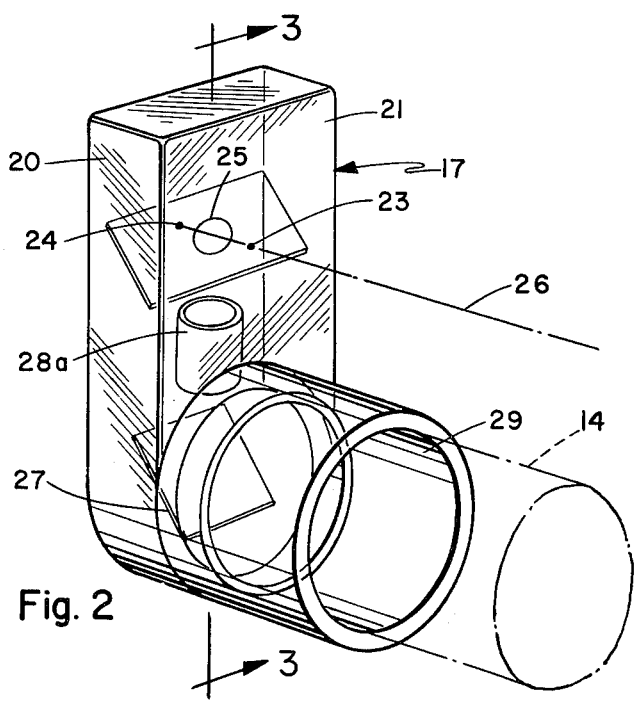
FIG. 2 is a perspective view of a preferred embodiment of the invention.
Figure 3:
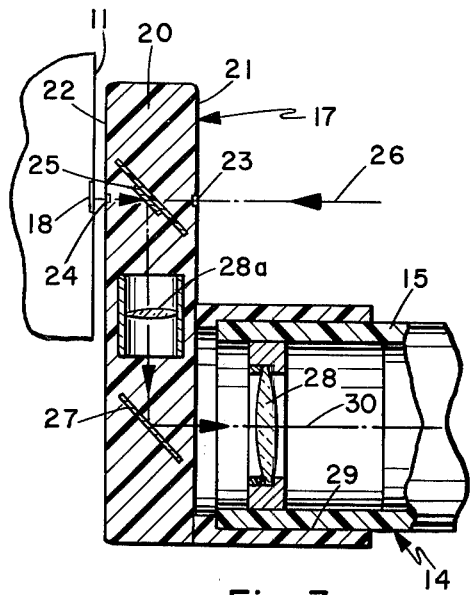
FIG. 3 is a sectional view taken generally along lines 3—3 of FIG. 2.

Turning now to FIGS. 2 and 3, there is illustrated a simplified embodiment of the present invention. The sighting head or aligning means designated generally by the numeral 17 comprises generally support means in the form of a transparent body member 20 having opposed surfaces 21 and 22 which are preferably disposed parallel to one another. The body 20 may be constructed of any suitable means but is preferably constructed of the molded transparent plastic.

Means defining a suitable reticle, such as first and second points 23 and 24, are formed in or supported by the respective faces 21 and 22. A reflector 25 is disposed between and aligned with the reticle means 23 and 24 and may be molded therein during manufacture. The reflector means 25 is aligned to reflect light passing in one direction along the axis of alignment of the reticle, designated by the center line or axis 26, to a reflector 27, which reflects it into proper alignment with receptor means 28 at the end of the barrel 15 of the light pen. The body member 20 includes suitable attachment or mounting means in the form of a socket defined by a bore 29 for receiving the forward end of the barrel 15 of the light pen.

The reticle may take any suitable form but in the illustrated embodiment comprise scratches or holes 23 and 24 formed in the surface of the transparent body member. The reflector means 25 can be embedded within the body portion during manufacture and properly aligned with the reticle at that time. The reflecting means 25 is also such as to permit sufficient light to pass therethrough to enable an observer to align the points with a point of reference, such as 18 on the master screen 11. In this embodiment, the axis 26 of the points 23 and 24 is properly aligned parallel to the barrel or axis 30 of barrel 15 of the light pen. The axis 26 extended also becomes the line of sight from the eye or point of sight 19 of the observer. Lenses, such as 28a, collect light and limit field of view to the light pen. They may be placed between surfaces 25 and 27 as shown or near the light pen as per 28 if the sensing element is up inside the barrel.

Figure 4:
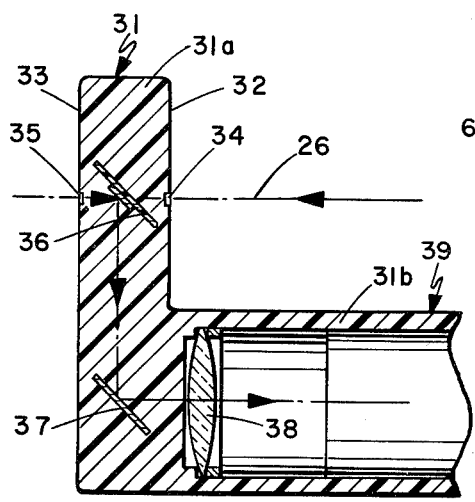
FIG. 4 is a sectional view like FIG. 3 of an alternate embodiment of the invention.

Turning now to the embodiment of FIG. 4, the sighting device and pen body generally designated by the numeral 31 are integral and comprises a transparent body member 31a formed or molded with a barrel 31b of a light pen. As in the previous embodiment a pair of opposed, preferably parallel plane faces 32 and 33 are defined by a body member 31a which serve to support or mount a pair of points 34 and 35. The points are preferably formed as in the previous embodiment but may comprise elongated elements such as thin blackened wires or the like in the form of crosshairs for visability and molded directly into the face of the member upon manufacture. Other suitable forms or cross hair construction are possible. Again a reflector designated by the numeral 36 is molded within the body portion between the points 34 and 36 in proper alignment therewith for reflecting light from the master screen along the axis thereof to a second reflecting member 37 which serves to reflect the light into the receptor 38 of a light pen generally designated by the numeral 39. Again the axis of the points 26 and that of the barrel 31b are preferably parallel.

Figure 6:
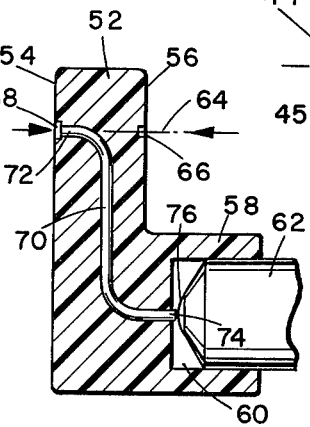
FIG. 6 is a sectional view of a further embodiment of the invention.
Figure 5:
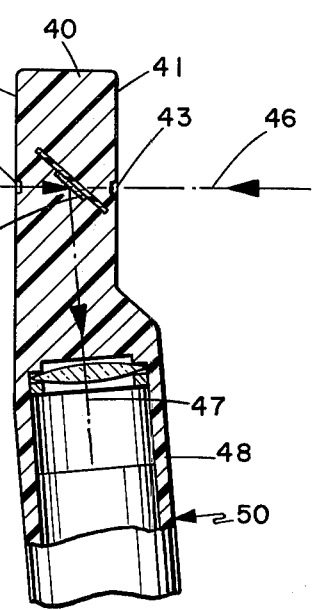
FIG. 5 is a sectional view of another embodiment of the invention.

Turning now to FIG. 5, a further modification of the invention is illustrated wherein, as in the previous embodiment, a transparent body member 40 includes a pair of parallel plane faces 41 and 42 which support suitable means defining points 43 and 44. Reflector means 45 is disposed between the points as in the previous embodiments and properly aligned therewith for reflecting light from an axis 46, along an axis 47 of a barrel 48 of a light pen 50. In this embodiment, the axis 46 and 47 are at substantially right angles to one another rather than parallel as in the previous embodiments. In fact, preferably the faces 41 and 42 are at a slight angle to the axis of the receptor to facilitate placing the sighting device close to a point on the master screen. Other orientations are possible within the scope of the invention and as in the previous embodiments the aligned device may be a separate attachment for the barrel of existing light pens or guns or it may be incorporated therein upon manufacture of the light pen. Turning now to FIG. 6, a still further embodiment of the invention is illustrated wherein a transparent body member 52 includes faces 54 and 56 which are preferably substantially parallel plane faces. The body member is preferably constructed of a suitable transparent material, such as a transparent plastic material. The body includes a cylindrical projection 58 which includes or has formed therein a light pen barrel receiving socket receiving the end or barrel 62 of the light pen.

A sighting axis 64 is defined by suitable reticle means such as a pair of dots 66 and 68 aligned and disposed on opposite faces of the plastic body. Suitable light receiving and transmitting means comprises a bundle of fiber optics 70 having a receiving end 72 for receiving light and transmitting it by way of the bundle of fiber optics to the opposite end 74 which is the light transmitting end which is in alignment with the receptor 76 of the light pen.

As in the previous embodiment, the sighting axis 64 is off-set sufficiently from the barrel 62 of the light pen to permit sighting therealong for aligning the light receiving end of the light receiving and transmitting means with a suitable point on the raster screen 10.

While the invention has been described and illustrated by means of specific embodiments, it is to be understood that numerous changes and modifications may be made therein without departing from the scope of the invention as defined in the impending claims.

Having described my invention, I now claim:

1. A light pen sighting device for aligning the receptor of a light pen with a source of light for eliminating parallax between said source and the receptor, and comprising:

support means for supporting sighting means on the barrel of a light pen adjacent to the receptor thereof, light receiving and transmitting means mounted by said support means and positioned for receiving and directing rays of light from a predetermined direction to the receptor of a light pen on which said support means is mounted, means defining first and second spaced apart reticle means disposed on opposite side of said light receiving and transmitting means and aligned therewith along an axis corresponding to said predetermined direction for directing light from said predetermined direction without parallax to the receptor to which said support means is mounted.

2. The sighting device of claim 1 wherein said support means comprises a transparent body having opposed surfaces, and said reticle means comprise points supported at said surfaces.

3. The sighting device of claim 2 wherein said transparent body is a body of molded plastic and said reflector is molded into said body.

4. The sighting device of claim 3 wherein said points are defined by cuts in the surfaces of said body.

5. The sighting device of claim 1 wherein said support means includes a socket for receiving the barrel of a light pen.

6. The sighting device of claim 1 wherein said support means includes a barrel of a light pen.

7. The sighting device of claim 5 wherein said socket means are formed to mount said support means to the side of said barrel so that said axis is substantially parallel to the axis of the pen barrel.

8. The sighting device of claim 5 wherein said socket means are formed to mount said support means to the side of said barrel so that said axis is at substantially right angles to the axis of said barrel.

9. The sighting device of claim 6 wherein said support means is formed to one side of said barrel so that said axis extends substantially parallel to the axis of said barrel.

10. The sighting device of claim 6 wherein said support means is formed so that said axis extends substantially at right angles to the axis of said barrel.

11. The sighting device of claim 3 including light collecting lens means mounted in said body adjacent to said reflectors for collecting light and limiting the field of view to said light pen.

12. The sighting device of claim 11 comprising a pair of spaced apart reflectors and said lens means is disposed between said reflectors.

13. The sighting device of claim 1 wherein said light receiving and transmitting means comprises a fiber optic bundle.

14. The sighting device of claim 13 wherein said fiber optics bundle includes a receiving end in alignment with said reticle means and a transmitting end aligned with said receptor.

15. The sighting device of claim 14 wherein said support means comprises a transparent body having opposed surfaces and said reticle means are formed in said surfaces.

16. The sighting device of claim 15 wherein said support means includes a socket for receiving the barrel of a light pen.

17. The sighting device of claim 15 wherein said support means is formed so that said axis extends substantially parallel to the axis of said barrel.

18. The sighting device of claim 15 wherein said support means is formed so that said axis extends at substantially right angles to the axis of said barrel.

* * * * *